United States Patent [19]

Yanagisawa

[11] 4,152,487
[45] May 1, 1979

[54] MAGNETIC RECORD MEMBER

[75] Inventor: Masahiro Yanagisawa, Tokyo, Japan

[73] Assignee: Nippon Electric Co., Ltd., Tokyo, Japan

[21] Appl. No.: 860,832

[22] Filed: Dec. 15, 1977

[30] Foreign Application Priority Data

| Dec. 17, 1976 [JP] | Japan | 51-52386 |
|---|---|---|
| Dec. 17, 1976 [JP] | Japan | 51-152393 |
| Dec. 22, 1976 [JP] | Japan | 51-155383 |
| Jan. 12, 1977 [JP] | Japan | 52-2625 |
| Feb. 10, 1977 [JP] | Japan | 52-14385 |
| Sep. 2, 1977 [JP] | Japan | 52-106104 |

[51] Int. Cl.² ............................ G11B 5/76; G11B 5/82
[52] U.S. Cl. .................................. 428/621; 428/64; 428/65; 428/447; 428/450; 428/538; 428/539; 428/622; 428/624; 428/632; 428/400; 428/428; 360/135; 360/136
[58] Field of Search .............. 428/900, 64, 538, 539, 428/65, 447, 450, 420, 596, 621, 632, 623, 928, 622, 624, 625, 626; 477/130, 131, 132, 611; 360/135, 136, 131

[56] References Cited

U.S. PATENT DOCUMENTS

| 3,466,156 | 9/1969 | Peters | 428/900 |
|---|---|---|---|
| 3,476,595 | 11/1969 | Nacci | 428/900 |
| 4,069,360 | 1/1978 | Yanagisawa | 427/131 |

*Primary Examiner*—Stanley S. Silverman
*Attorney, Agent, or Firm*—Ostrolenk, Faber, Gerb & Soffen

[57] ABSTRACT

A magnetic record member for use in magnetic recording devices is disclosed. The record member comprises a non-magnetic alloy disk polished to a mirror surface, a non-magnetic alloy layer formed on the disk, a magnetic thin film medium formed on the surface of the alloy layer, and a protective polysilicate film layer formed on the alloy layer. In certain embodiments, an oriented lubricant layer is formed on the polysilicate film layer.

25 Claims, 5 Drawing Figures

MAGNETIC RECORD MEMBER

BACKGROUND OF THE INVENTION

This invention relates to a magnetic record member for use in magnetic recording devices such as a magnetic disc and magnetic drum.

Magnetic recording and reproducing systems utilizing record/playback heads and magnetic record members (e.g. magnetic disks) may be classified into two general systems. In the first system, a record or playback operation is initiated by bringing the record/playback head into contact with the surface of a magnetic record member and thereafter rotating the record member at a given r.p.m. As a result of this operation, a protective air layer is formed between the head and the surface of the magnetic record member during the record or playback operation. The foregoing start-stop system will hereinafter be referred to as CSS. Upon the completion of a record or playback operation, the rotation of the magnetic record member is stopped while the head and record member are still in frictional contact with each other.

In the second system, the magnetic record member is rotated at a given r.p.m. before the head is brought into contact with the surface of the record member. Again a protective air layer is formed between the head and the magnetic record member during the record and playback operations. In summary, the first class of systems bring the head into frictional contact with the record member both at the start and at the termination of a record or playback operation. In the second system, the head is brought into frictional contact with the record member when it is urged against the surface of the latter at the initiation of a record or playback operation. Such frictional contact between the head and the magnetic record member results in wear of the head and magnetic record member, and eventually harms both the head and a magnetic metal thin film medium formed on the record member. Another problem caused by the foregoing frictional contact is that slight variations in attitude of the head results in a lack of uniformity of the load imposed on the head causing damage to both the head and the surface of the record member. The foregoing problems are compounded during the record or playback due to the fact that the head occasionally contacts the record member resulting in large frictional forces between the head and the record member. In order to minimize damage to both the head and the record member resulting from the foregoing frictional forces, a protective film should be provided on the surface of the magnetic record member. To this end, the prior art has utilized plated metal films such as Cr, Rh, Ni-P and the like. Such films have not been provided adequate protection.

An alternative film is disclosed in U.S. Pat. No. 3,466,156. In accordance with this patent, a synthesized polymer thin film is formed on a magnetic metal thin film medium, and a thin wax film formed on the metal thin film medium. While this film has provided improved protection for the record member, the synthesized polymer thin film and the wax film fail to form a sufficient adhesive bond to the underlayer. As a result, they tend to peel off the underlayer due to repeated friction contact between the head and the magnetic record member.

Yet another protective layer is disclosed in U.S. Pat. No. 3,719,525. In this patent, the protective layer comprises an oxidized magnetic metal thin film medium to which silicone oil has been applied. The drawback of this protective film is that it impairs the magnetic characteristics of a magnetic thin film applied to the record member. Additionally, this protective layer also exhibits the adhesion problem noted with respect to U.S. Pat. No. 3,466,156 noted above.

The inventor has proposed a magnetic record member having a protective film consisting of a polysilicate film coated on a magnetic metal thin film medium or an oriented lubricant coated on the aforesaid polysilicate film (see U.S. patent application Ser. Nos. 700,191 and 734,962 filed on June 28, 1976 and Oct. 22, 1976, respectively). While this protective film has been satisfactory for most applications, it is desirable to provide an even more reliable protective layer.

BRIEF DESCRIPTION OF THE INVENTION

The present invention is directed towards an improved magnetic record member comprising a non-magnetic alloy disc polished to a mirror surface, a magnetic metal thin film coated on the surface of the disc substrate and a polysilicate film containing stress relaxation agent and/or a hydrolysis polymer of a metal alkoxide coated on the magnetic metal thin film medium directly or through the medium of a high adhesive layer. The present record member further can comprise an oriented lubricant coated on the polysilicate film.

BRIEF DESCRIPTION OF THE DRAWINGS

For the purpose of illustrating the invention, there is shown in the drawings several embodiments which are presently preferred; it being understood, however, that this invention is not limited to the precise arrangements and instrumentalities shown.

DETAILED DESCRIPTION OF THE INVENTION

Figure 1:
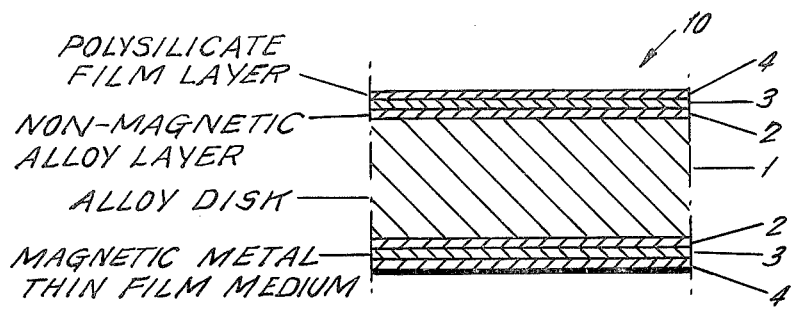
FIGS. 1 to 5 are cross-sectional views of magnetic record members of first to fifth embodiments of the invention.

Referring now to the drawings wherein like numerals indicate like elements, there is shown in FIG. 1 a magnetic record member constructed in accordance with one embodiment of the present invention and designated generally as 10. Magnetic record member 10 includes an alloy disc 1, a non-magnetic alloy layer 2 coated on the surface of the disc 1, a magnetic metal thin film medium 3 coated on the polished surface of the non-magnetic alloy layer 2 and a polysilicate film 4 coated on the film medium 3. The polysilicate film contains a stress relaxation agent and/or a hydrolysis polymer of metal alkoxide.

Figure 2:
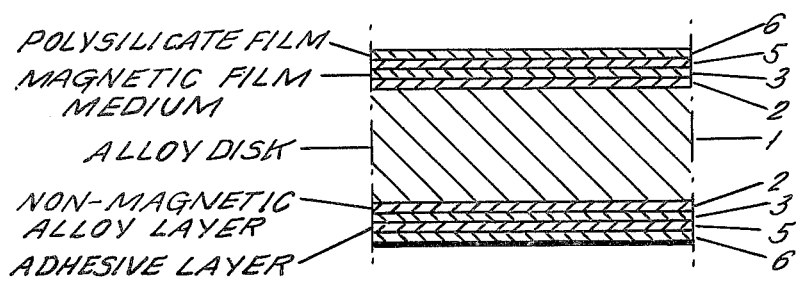

A second embodiment of the present invention is shown in FIG. 2. In this embodiment the magnetic head comprises a non-magnetic alloy disc 1, a non-magnetic alloy layer 2, a magnetic metal thin film medium 3, a highly adhesive layer 5 and a polysilicate film 6 containing a stress relaxing agent and/or a hydrolysis polymer of a metal alkoxide.

Figure 3:
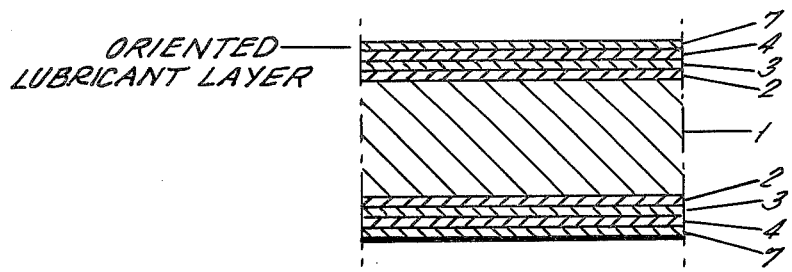

The embodiment of FIG. 3 is identical to that of FIG. 1 except that it also includes an oriented lubricant 7 coated on the polysilicate film. The embodiment of FIG. 4 is identical to that of FIG. 2 except that it includes an oriented lubricant 7 coated on the polysilicate film.

Figure 4:
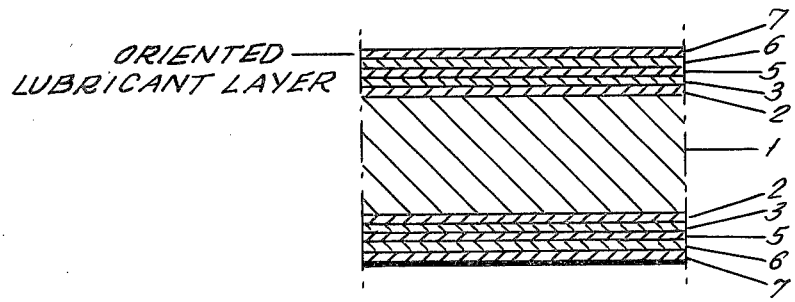
Figure 5:
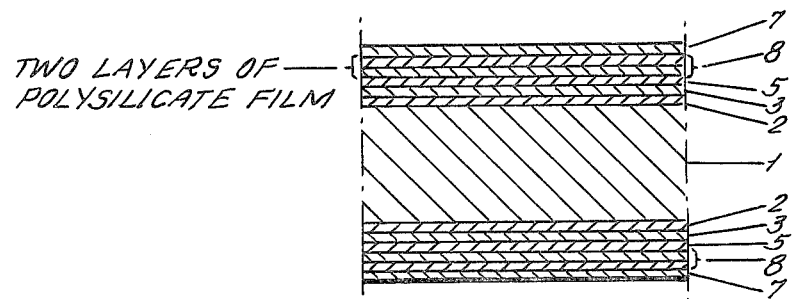

The embodiment of FIG. 5 is identical to that of FIG. 4 except that it includes two layers 8 of a polysilicate film rather than the single layer shown in FIG. 4.

It is desirable for the upper and lower faces of the alloy disk 1 to be as flat as possible. Preferably, these faces are finished to a topography of no more than 50 microns in the circumferential direction and 10 microns in the radial direction. If these topographical limitations are not met, the spacing between the magnetic head and the magnetic record member varies. Such spacing variations lead to undesirable variations in the record and playback characteristics of the audio output. It is also preferable that the non-magnetic alloy layer 2 be polished to a mirror surface having a surface roughness of no more than $0.2\mu$. It should be noted at this point that if the alloy disk 1 is metallic, the non-magnetic alloy layer 2 may be deleted.

The thin film medium 3 is adapted for high-density recording and may be electroplated onto the surface of the non-magnetic alloy layer 2. The protective film of each of the embodiments of the present invention protect the thin film medium 3 both from the frictional contact with the magnetic record medium and/or the influences of moisture or temperature.

The requirements of a suitable protective film are: (1) that the hardness of a film is high; (2) that the internal stresses in the film is small; (3) that the adhesion to the magnetic metal thin film medium is excellent; and (4) that the coefficient of friction of the film is small. In this respect, the following films may effectively protect the magnetic record member from a frictional contact phenomenon of the head:

(i) a film including polysilicate to which is added: (a) a stress relaxation agent such as a metallic oxide adapted to reduce an internal stress of the film as required; (b) an organic polymer compound having a functional group reactive to polysilicate; (c) a silane coupling agent; or (d) a surface coupling agent;

(ii) a film containing hydrolysis polymer of metal alkoxide having high hardness;

(iii) a film containing both the stress relaxation agent and the hydrolysis polymer of metal alkoxide;

(iv) a film consisting of polysilicate (which contains or is free of hydrolysis polymer of metal alkoxide and/or said stress relaxation agent) tightly coated through the medium of a high adhesive layer on the surface of the magnetic metal thin film medium; and (v) a film consisting of polysilicate on which is coated an oriented lubricant for the purpose of lowering the effective coefficient of friction of the film.

The term polysilicate, as used herein, refers to inorganic polymer compounds in which covalent Si—O bonds are linked to Si—OH—O bonds, for example:

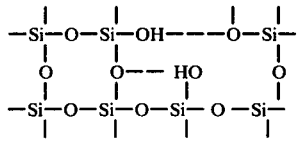

In the above mesh-like structure, solid lines represent covalent bonds, while chain lines represent hydrogen bonds.

The polysilicate may be manufactured according to the dehydration condensation polymerization of tetraalkoxysilane or tetrahydroxysilane Si(OH)$_4$ which is a hydrolysis product of silicon acylate. Tetraalkoxysilane which is a raw material for tetrahydroxysilane is expressed by a chemical formula Si(OR)$_4$, while silicon acylate is expressed by a chemical formula Si(OCOR)$_4$, wherein R represents an alkyl group, i.e., methyl group, ethyl group, propyl group and butyl group.

The hydrolysis polymer of a metal alkoxide as used herein includes a hydrolysis of a compound expressed by the following general formula: $RmM(OR')_{n-m}$, wherein M represents a metal such as Ti,Zr,-V,Al,Sn,Zn,Be,Ce,Co,Cr,Cu,Dy,Eu,Fe, Ga,Ge,Hf,In,Mg,Mn,Mo,Nb,Ni,Pd,Rh,Sb,Th,Tl,Ta,V,W, and R and R' represent alkyl groups such as methyl, ethyl, propyl, butyl, and amyl, OR' is generally referred to as an alkoxy group, m is a valency of M, and m is an integar from 0 to n−1. Metal alkoxides afford a higher reactivity as compared with an organic metal compound (metal chelate) and may polymerized according to hydrolysis, thereby forming a high hardness amorphous polymer. In addition, a metal alkoxide well reacts with tetraalkoxysilane, tetrahydroxysilane, tetraacylsilane (silicon tetraacylate) which are the starting materials of polysilicate. Thus, a liquid mixture of metal alkoxide and the starting materials is applied and baked, thereby providing a polysilicate film containing a hydrolysis polymer of a metal alkoxide.

A metal alkoxide is typical of starting material for a hydrolysis of metal alkoxide. However, a metal acylate $RmM(OCOR')_{n-m}$ may give the same results as those obtained from metal alkoxide.

A metal oxide used as a stress relaxation agent to be contained in the polysilicate film includes compounds given below or a combination thereof;

Li$_2$O, Na$_2$O, K$_2$O, Pb$_2$O, Cs$_2$O, MgO, CaO, ZnO, PbO, Al$_2$O$_3$, GaO, BaO, SrO, MnO, FeO, BeO, Fe$_2$O$_3$, CdO, Tl$_2$O$_3$.

One or more of these metal oxides are selected and then dissolved thoroughly into an alcohol solution containing tetrahydroxysilane and applied as a coating. In addition, the organic polymer having at least one functional group reactive to polysilicate and serving as a stress relaxation agent may be utilized as a film on the surface of a magnetic metal thin film medium or as a high adhesive layer, which is excellent in resistance to frictional contact with the head by the stress relaxation action of the organic polymer in addition to a strong bond of polysilicate to a functional group of organic polymer.

The functional group which reacts with polysilicate includes: —COOH, —NH$_2$, —SH, —COOR, —NHR, >NH, —CHO, —NCO, Si—OH, Si—OR, Si—X

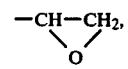

—CH$_2$OH,

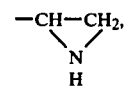

—OCOR, —OH wherein R represents an alkyl group, and X represents halogen.

Polymer having at least one functional group as above includes: N-methoxymethyl nylon, silicone intermediate, epoxy resin, phenol resin, melamine resin; urea resin, cellulose (acetyl cellulose, nitro cellulose, methyl cellulose, ethyl cellulose and the like), polyvinyl resin (polyvinyl acetate, polyvinyl alcohol, polyvinyl formal, polyvinyl butyral, and the like) polyisocyanate, polymethylmethacrylate, and the like. Acid may be added for the purpose of enhancing the reactivity of functional groups of these organic polymers with polysilicate. Included as a hardening agent for epoxy resin are diethylene triamine, diethylaminopropylamine, polyamide resin, amine group containing silane coupling agent, acid anhydride such as phthalic anhydride, tetrahydrophthalic anhydride, and dodecylsuccinic anhydride, and isocyanates such as hexamethylene diisocyanate, tolyene dissocyanate, polyisocyanate, and the like. Said silicone intermediate is a polymer of an average molecular weight of 500 to 200, has a functional group such as SiOH or SiOCH$_3$, and is tightly bound to polysilicate.

The silane coupling agent for use as a high adhesive agent or a stress relaxation agent is one kind of silane compounds expressed by: $R_c Si(Xa)_n(Xb)_{3-n}$, wherein n represents an integer of 0 to 3, Xa and Xb represent halogen atoms, ORd, OCORd, or OORd (Rd is, for instance, an alkyl group such as —CH$_3$, —C$_2$H$_5$, —CH$_2$CH$_2$OCH$_3$,

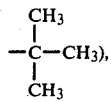

while Rc presents a portion consisting of organic compounds having a functional group, such as

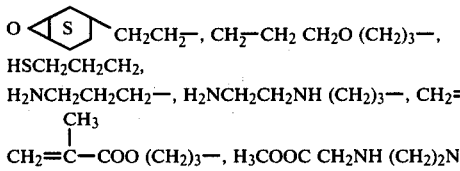

HSCH$_2$CH$_2$CH$_2$,
H$_2$NCH$_2$CH$_2$CH$_2$—, H$_2$NCH$_2$CH$_2$NH (CH$_2$)$_3$—, CH$_2$=CH—,

CH$_2$=C̄—COO (CH$_2$)$_3$—, H$_3$COOC CH$_2$NH (CH$_2$)$_2$NH (CH$_2$)$_3$—,
       |
       CH$_3$

Xa and Xb produce a silanol group Si—OH according to hydrolysis.

The silane coupling agent as used herein includes the following:

| | |
|---|---|
| vinyltrichlorosilane | CH$_2$=CHSiCl$_3$ |
| vinyltriethoxysilane | CH$_2$=CHSi (OC$_2$H$_5$)$_3$ |
| vinyl-tris(beta-methoxy ethoxy) silane | CH$_2$=CHSi (OCH$_2$CH$_2$O CH$_3$) |
| gamma-methacryloxypropyl trimethoxysilane | CH$_2$=C̄—COO (CH$_2$)$_3$Si (OCH$_3$)<br>    \|<br>    CH$_3$ |
| beta (3,4-epoxycyclohexyl) ethyltrimethoxysilane | 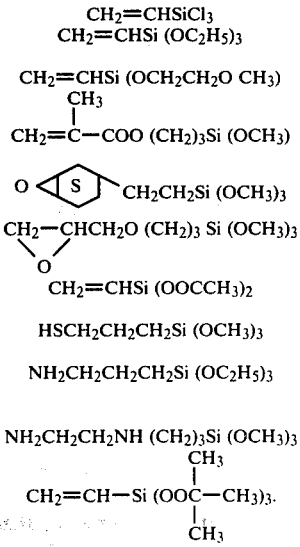 |
| gamma-glycidoxypropyl-trimethoxysilane | CH$_2$—CHCH$_2$O (CH$_2$)$_3$ Si (OCH$_3$)$_3$<br>    \\_/<br>     O |
| vinyltriacetoxysilane | CH$_2$=CHSi (OOCCH$_3$)$_2$ |
| gamma-mercaptopropyl-trimethoxysilane | HSCH$_2$CH$_2$CH$_2$Si (OCH$_3$)$_3$ |
| gamma-aminopropyl tri-ethoxysilane | NH$_2$CH$_2$CH$_2$CH$_2$Si (OC$_2$H$_5$)$_3$ |
| N-beta (aminoethyl) gamma-aminopropyltrimethoxy silane | NH$_2$CH$_2$CH$_2$NH (CH$_2$)$_3$Si (OCH$_3$)$_3$ |
| vinyltris (t-butylperoxy) silane | CH$_2$=CH—Si (OOC̄—CH$_3$)$_3$.<br>             \|<br>             CH$_3$ |

In addition, the silane coupling agent includes polyaminosilane of a matrix form as shown below in which a unit of

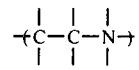

is repeated in the portion of Rc, and organic group having primary, secondary and, tertiary amino groups are branched in a complicated form:

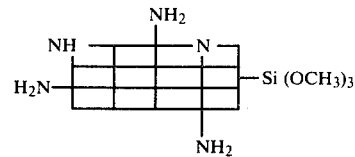

Furthermore, the surface coupling agent to be described hereinafter may be used as another stress relaxation agent.

Still furthermore, chrome complex typical of methacrylatochromic chloride may be used as a high adhesive agent in addition to a silane coupling agent. The above chrome complex has the following structure and bonds the magnetic metal thin film medium to polysilicate tightly:

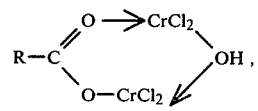

wherein R is a hydrocarbon having a functional group such as

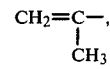

while an arrow mark represents a coordinate bond.

The lubricant layer to be coated on the polysilicate film surface strongly ahderes to the film, and consists of an oriented lubricant having a small frictional force. This oriented lubricant fails to adhere to the surface of a metal tightly.

The oriented lubricant as used herein includes, as shown in examples hereinafter, oils such as oriented silicone oil, fluoro oil, fluoro silicone oil, and silane group or silazane group (referred to as a surface coupling agent hereinafter) such as octadecyltrichlorosilane, hexamethyldisilazane, N,N-dimethyl—N—octadecyl—3-aminopropyl trimethoxysilyl chloride (DMOAP), dimethyl-dichlorosilane, and the like.

Silane may be expressed by the following general formula:

wherein R represents alkyl group or aromatic hydrocarbon such as CH$_3$, C$_2$H$_5$, C$_3$H$_7$, C$_4$H$_9$, C$_{18}$H$_{37}$, or fluoro carbon such as CF$_3$, C$_2$F$_5$, C$_3$F$_7$, C$_{18}$F$_{37}$. X represents alkoxy group such as —OCH$_3$, —OC$_2$H$_5$, —OC$_3$H$_7$ or halogen such as Cl, Br or alkylperoxy group such as —OOC$_4$H$_9$. n represents an integar of 1, 2, or 3.

Orientation as referred to herein is meant by the fact that the structure of a lubricant is oriented into a portion adapted to couple to an underlayer and a portion which is less adhesive to the head and hence affords lubricity. For instance, dimethylsilicone oil is of a coil-like structure.

The mere application of dimethylsilicone oil on the polysilicate film does not give desired adhesion, and hence dimethylsilicone oil is readily removed by cleaning. If the dimethylsilicone oil is used without being cleaned, the oil is collected by the head, thus exerting an adverse effect on a floating condition of the head. When the dimethylsilicone oil is applied to the polysilicate film surface and then baked at a temperature above 150° C. (degrees centigrade), the oil is oriented into a portion containing oxygen adapted to couple to the underlayer and a portion containing ethyl group having lubricity. The portion containing oxygen in dimethylsilicone oil is strongly chemically adsorbed to a silanol group present on the polysilicate film surface serving as an underlayer.

Octadecyltrichlorosilane in the surface coupling agent on the other hand is of the following structure and hydrolyzed into a compound containing a silanol group (Si—OH) having high reactivity:

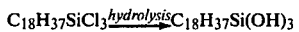

$$C_{18}H_{37}SiCl_3 \xrightarrow{hydrolysis} C_{18}H_{37}Si(OH)_3$$

This compound consists of a portion having a silanol group adapted to couple to the underlayer and a portion containing octadecyl group ($-C_{18}H_{37}$) having lubricity. The portion containing a silanol group causes the following dehydration-condensation reaction (I) with a silanol group (Si—OH) present on the polysilicate film surface or water adsorbed to the polysilicate film surface for tight bonding:

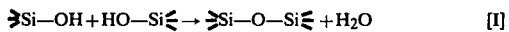

$$\geqslant Si-OH + HO-Si \leqslant \rightarrow \geqslant Si-O-Si \leqslant + H_2O \qquad [I]$$

This reaction takes place at a room temperature. However, when heated, the reaction will take place more completely.

In addition, a lubricant layer of such an oil or a surface coupling agent may be formed into a thinner film. The lubricant layer is coated on the polysilicate film surface, followed by a chemical reaction, or further baked to cause the layer to adhere to the polysilicate film, after which cleaning is applied by using a neutral cleaning agent so that excessive lubricant which does not adhere thereto may be removed, and the lubricant layer becomes a monomolecular layer.

These oriented lubricants tend to particularly tightly couple to the polysilicate film, thereby forming a lubricant layer having high adhesiveness. The oriented lubricant is adsorbed into a three-dimensional mesh-like structure of the polysilicate film so that even if the oriented lubricant layer is peeled by the head to some extent, the lubricating action thereof may be retained. This is another excellent characteristic of the magnetic record member of the present invention in case where such an oriented lubricant is applied to the polysilicate film.

The following examples illustrate the features and advantages of the present invention in more detail.

EXAMPLE 1

A disc type aluminum alloy substrate was finished to a surface having a slight topograph (no more than 50μ and 100μ in the circumferential direction and in the radial direction) according to turning and heat-flattening processes to provide the alloy disc 1. A nickel-phosphorus (Ni-P) was plated on the surface of the disc-type aluminum alloy substrate to a thickness of about 50 microns to form the non-magnetic alloy layer 2. Then, the nickel-phosphorus film is mirror-finished to a surface roughness of no more than 0.04 microns to a thickness of about 30 microns. Thereafter, a cobalt-nickel-phosphorus (Co-Ni-P) alloy was plated thereon to a thickness of about 0.05 microns to form the magnetic metal thin film medium 3. Then, a solution of the following composition was thoroughly mixed and then applied to the surface of the Co-Ni-P alloy according to a spin coating process (r.p.m. 200) to a thickness of 500 Angstroms. The disc thus prepared was baked in an electric oven at a temperature of 200° C. for 3 hours, thereby forming a magnetic record member:

| | |
|---|---|
| tetrahydorxysilane 11% ethyl alcohol solution | 10 weight % (percent) |
| BaO | 0.01 weight % |
| n-butyl alcohol | balance |

EXAMPLE 2

A disc was baked under a condition similar to Example 1, except that a solution of a composition shown below was used:

| | |
|---|---|
| tetrahydroxysilane 11% ethyl alcohol solution | 10 weight % |
| n-butyl alcohol | 90 weight % |
| zirconium propylate | 0.03 weight % |

EXAMPLE 3

A disc was baked under a condition similar to Example 1, except that a solution of a composition shown below was used:

| | |
|---|---|
| tetrahydroxysilane 11% ethyl alcohol solution | 10 weight % |
| n-methoxy methyl nylon | 0.05 weight % |
| n-butyl alcohol | balance |

EXAMPLE 4

A disc was baked under a condition similar to Example 1, except that a solution of a composition shown below was used:

| | |
|---|---|
| tetrahydroxysilane 11% ethyl alcohol solution | 10 weight % |
| polyaminosilane (silane coupling agent) | 0.03 weight % |
| n-butyl alcohol | balance |

EXAMPLE 5

Following the procedure as given in Example 1, 0.1% n-butyl alcohol solution of gamma-aminopropyl-trimethoxysilane was spin-coated on a disc in which a Ni-P film was formed on the aluminum alloy disc and then a Co-Ni-P film was formed. Next, the spin-coating was continued for ten minutes as followed by generation of heat and drying, so that an extremely thin and high adhesive layer consisting of gamma-aminopropyl-trimethoxysilane may be formed. A solution of a composition shown below was then applied to the high adhesive layer of gamma-aminopropyltriethoxysilane in a condition similar to Example 1, thereby forming a polysilicate film to a thickness of 500 Angstroms.

| tetrahydroxysilane 11% ethyl alcohol | 10 weight % |
|---|---|
| n-butyl alcohol | 90 weight % |

EXAMPLE 6

According to the procedure given in Example 5, a high adhesive layer was formed by using 0.1% aqueous solution of gamma-glycidoxypropyltrimethoxysilane as a high adhesive-agent-forming solution to form a high adhesive layer, and then a solution of a composition shown below as applied to the above high adhesive layer to a thickness of 0.1 micron according to the procedure given in Example 5:

| tetrahydroxysilane 11% ethyl alcohol solution | 20 weight % |
|---|---|
| N-beta (aminoethyl) gamma-aminopropyltrimethoxysilane 0.1% butyl alcohol solution | 80 weight % |

EXAMPLE 7

According to the procedure similar to Example 5, 0.1% n-butyl alcohol solution of gamma-glycidoxypropyltrimethoxysilane as a high adhesive agent or one of silane coupling agents was applied according to the spin-coating process to provide a high adhesive layer, after which a solution of a composition shown below was applied to the high adhesive layer to provide a protective film of a thickness of 0.1 micron:

| tetrahydroxysilane 11% ethyl alcohol solution | 7 weight % |
|---|---|
| zirconium isopropylate | 3 weight % |
| n-butyl alcohol | balance |

EXAMPLE 8

Following Example 5, a high adhesive layer was formed by using 0.1 weight % n-butyl alcohol solution of a methacrylate chromic chloride. Then, a solution of a composition given below was applied to the above high adhesive layer according to the procedure given in Example 5, followed by baking:

| tetrahydroxysilane 11% ethyl alcohol solution | 9 weight % |
|---|---|
| vanadyl isopropylate | 1 weight % |
| SrO | 0.01 weight % |
| n-butyl alcohol | balance |

EXAMPLE 9

Following the procedure given in Example 5, a high adhesive layer was formed by using 0.1 weight % n-butyl alcohol solution of methacrylate chromic chloride as a high adhesive agent, and then a solution of a composition given below was applied to the above high adhesive layer according to the procedure given in Example 5 as followed by baking:

| tetrahydroxysilane 11% ethyl alcohol solution | 9 weight % |
|---|---|
| aluminum isopropoxide | 1 weight % |
| N-methoxymethyl nylon | 0.05 weight % |
| n-butyl alcohol | balance |

EXAMPLE 10

According to the procedure similar to Example 5, a high adhesive layer was formed by using a 0.1 weight % n-butyl solution of gamma-glycidoxypropyltrimethoxysilane, and then a solution of a composition given below was applied in a manner similar to Example 5 as followed by baking:

| tetrahydroxysilane 11% ethyl alcohol solution | 9 weight % |
|---|---|
| zirconium isopropulate | 1 weight % |
| polyaminosilane | 0.1 weight % |
| n-butyl alcohol | balance |

EXAMPLE 11

Following the procedure given in Example 5, a high adhesive layer was formed by using 0.1 weight % n-butyl alcohol solution of gamma-aminopropyltrimethoxysilane, and then a solution of a composition given below was applied to the adhesive layer in a manner similar to Example 5 followed by baking:

| Tetrahydroxysilane 11% ethyl alcohol | 10 weight % |
|---|---|
| BaO | 0.01 weight % |
| n-butyl alcohol | balance |

EXAMPLE 12

Following the procedure given in Example 11, a high adhesive layer was formed and then a solution of a composition given below was applied to the high adhesive layer to provide a disc. Then, the disc was baked under a condition similar to Example 11:

| tetrahydroxysilane 11% ethyl alcohol solution | 10 weight % |
|---|---|
| epoxy resin | 0.05 weight % |
| n-butyl alcohol | balance |

EXAMPLE 13

Like Example 1, a solution of a composition given below was applied and baked to provide a magnetic record member:

| tetrahydroxysilane 11% ethyl alcohol solution | 9 weight % |
|---|---|
| zirconium isopropylate | 1 weight % |
| BaO | 0.01 weight % |
| n-butyl alcohol | balance |

EXAMPLE 14

According to the procedure similar to Example 1, a solution of a composition given below was applied to the magnetic metal thin film medium to provide a polysilicate film containing a stress relaxation agent and a hydrolysis polymer of metal alkoxide by coating and baking in a manner similar to Example 1:

| tetrahydroxysilane 11% ethyl alcohol solution | 9 weight % |
|---|---|
| vanadyl isopropylate | 1 weight % |
| N-methoxy methyl nylon | 0.05 weight % |
| n-butyl alcohol | balance |

EXAMPLE 15

Following a procedure given in Example 1, a solution of a composition given below was coated on a magnetic metal thin film medium to form a polysilicate film containing a stress relaxation agent and hydrolysis polymer of a metal alkoxide by coating and baking in a manner similar to Example 1:

| tetrahydroxysilane 11% ethyl alcohol solution | 9 weight % |
|---|---|
| tetraisopropyl titanate | 1 weight % |
| epoxy resin | 0.05 weight % |
| polyamino silane | 0.05 weight % |
| isobutyl acetate | 50 weight % |
| n-propyl alcohol | balance |

EXAMPLE 16

According to the procedure given in Example 1, a solution of a composition given below was applied to a magnetic metal thin medium to provide a polysilicate film containing a stress relaxation agent and hydrolysis polymer of metal alkoxide by coating and baking:

| tetrahydroxysilane 11% ethyl alcohol | 9 weight % |
|---|---|
| chrominium isopropylate | 1 weight % |
| N-beta (aminoethyl) gamma-aminopropyltrimethoxysilane | 0.1 weight % |
| isopropyl alcohol | balance |

EXAMPLE 17

Following the procedure given in Example 1, a solution of a composition given below was applied, and then 0.1 weight % n-butyl alcohol solution of hexamethyldisilazane was applied as an oriented lubricant to the polysilicate film containing a metallic oxides according to a spin coating process followed by baking at 200° C. for one hour to provide a protective film:

| tetrahydroxysilane 11% ethyl alcohol solution | 10 weight % |
|---|---|
| BaO | 0.01 weight % |
| n-butyl alcohol | balance |

EXAMPLE 18

In accordance with the procedure given in Example 1, a solution of a composition given below was applied to a magnetic metal thin film medium to form a film, and then fluoro oil was applied as an oriented lubricant followed by baking at 200° C. for 8 hours, cleaning with neutral cleaning agent, water rinsing and cleaning with trichloroethylene, thereby forming an oriented lubricant layer:

| tetrahydroxysilane 11% ethyl alcohol solution | 10 weight % |
|---|---|
| epoxy resin | 0.05 weight % |
| polyaminosilane | 0.05 weight % |
| isobutyl acetate | 50 weight % |
| n-butyl alcohol | balance |

EXAMPLE 19

Following the procedure given in Example 5, a high adhesive layer was formed on a magnetic metal alloy layer by using a 0.1 weight % n-butyl alcohol solution of gamma-glycidoxypropyltrimethoxysilane which is one of silane coupling agents, and then a solution of a composition given below was applied to the high adhesive layer thus prepared in a manner similar to Example 5. Then, 0.1 weight % n-butyl alcohol solution of hexamethyl disilazane as an oriented lubricant was applied to the film thus prepared. Then, the film was baked at 200° C. for one hour, thereby providing a protective film:

| tetrahydroxysilane 11% ethyl alcohol solution | 10 weight % |
|---|---|
| BaO | 0.01 weight % |
| n-butyl alcohol | balance |

EXAMPLE 20

According to the procedure similar to Example 19, a high adhesive layer was formed on a magnetic metal alloy layer by using 0.1 weight % n-butyl alcohol solution of gamma-aminopropyltriethoxysilane, and then a solution of a composition given below was applied to the high adhesive layer thus prepared in a manner similar to Example 19. Then 0.1 weight % n-butyl alcohol solution of hexamethyldisilazane as an oriented lubricant was applied in a manner similar to Example 19 followed by baking:

| tetrahydroxysilane 11% ethyl alcohol | 10 weight % |
|---|---|
| phenol resin | 0.05 weight % |
| methylisobutylketone | 50 weight % |
| n-butyl alcohol | balance |

EXAMPLE 21

Following the procedure given in Example 19, a high adhesive layer was formed on a magnetic metal alloy layer by using 0.1 weight % n-butyl alcohol solution of methacrylate chromic chloride, and then a solution of a composition given below was applied to the high adhesive layer thus prepared in a manner similar to Example 19. Then, fluorosilicone oil as an oriented lubricant was applied thereto followed by baking at 200° C. for 8 hours, then cleaning with a neutral cleaning agent and water rinsing to provide an oriented lubricant layer:

| tetrahydroxysilane 11% ethyl alcohol solution | 10 weight % |
|---|---|
| methyltriethoxysilane | 0.1 weight % |
| n-butyl alcohol | balance |

EXAMPLE 22

In accordance with the procedure given in Example 1, a solution of a composition given below was applied to provide a film. Then, 0.1 weight % n-butyl alcohol solution of hexamethyldisilazane as an oriented lubricant was applied to the film according to a spin coating process. Then, the disc was baked at 200° C. for one hour to provide a protective film thereon. Thus, a magnetic record member was provided.

| tetrahydroxysilane 11% ethyl | |
|---|---|
| alcohol solution | 7 weight % |
| zirconium isopropylate | 3 weight % |
| n-butyl alcohol | 90 weight % |

EXAMPLE 23

Following the procedure given in Example 1, a solution of a composition given below was applied to a magnetic metal thin film medium in a manner similar to Example 1 to form a film. Then, 0.1 weight % n-butyl alcohol solution of octadecyltrichlorosilane as an oriented lubricant was applied to the film thus prepared in a manner similar to Example 22 as followed by baking:

| tetrahydroxysilane 11% ethyl | |
|---|---|
| alcohol solution | 9 weight % |
| tetrapropyltitanate | 1 weight % |
| BaO | 0.01 weight % |
| n-butyl alcohol | balance |

EXAMPLE 24

According to the procedure given in Example 1, a solution of a composition given below was applied to a magnetic metal thin film medium in a manner similar to Example 1. Then, fluoro oil as an oriented lubricant was applied to the film thus prepared as followed by baking at 200° C. for 8 hours, cleaning with a neutral cleaning agent, water rinsing and cleaning with trichloroethylene, thereby forming an oriented lubricant layer:

| tetrahydroxysilane 11% ethyl | |
|---|---|
| alcohol solution | 9 weight % |
| vanadyl propylate | 1 weight % |
| isopropyl alcohol | balance |

EXAMPLE 25

Following the procedure given in Example 1, a solution of a composition given below was applied to a magnetic metal thin film medium to provide a film according to a manner similar to Example 1. Then, dimethylsilicone oil was applied as an oriented lubricant as followed by baking at 200° C. for 8 hours, cleaning with a neutral cleaning agent, water rinsing and cleaning with trichloroethylene to form an oriented lubricant layer:

| tetrahydroxysilane 11% ethyl | |
|---|---|
| alcohol solution | 9 weight % |
| barium n-butylate | 1 weight % |
| gamma mercaptopropyl-trimethoxysilane | 0.1 weight % |
| n-butyl alcohol | balance |

EXAMPLE 26

In accordance with the procedure given in Example 19, 0.1 weight % n-butyl alcohol solution of gamma-glycidoxypropyltrimethoxysilane which is one of silane coupling agents, was applied according to a spin coating process to provide a high adhesive layer. Then, a solution of a composition given below was applied to the film thus prepared in a manner similar to Example 19 to form a film thereon.

Next 0.1 weight % n-butyl alcohol of hexamethyldisilazane as an oriented lubricant was applied according to the spin coating process as followed by baking at 200° C. for one hour to provide a protective film:

| tetrahydroxysilane 11% ethyl | |
|---|---|
| alcohol solution | 7 weight % |
| zirconium isopropylate | 3 weight % |
| n-butyl alcohol | 90 weight % |

EXAMPLE 27

Following the procedure given in Example 26, a high adhesive layer was formed by using 0.1 weight % n-butyl alcohol solution of methacrylate chromic chloride, and then a solution of a composition given below was applied to the high adhesive layer in a manner similar to Example 26. Next, dimethylsilicone oil as an oriented lubricant was applied to the film thus prepared, followed by baking at 200° C. for 8 hours, cleaning with a neutral cleaning agent, water rinsing and cleaning with trichloroethylene to provide an oriented lubricant layer:

| tetrahydroxysilane 11% ethyl | |
|---|---|
| alcohol solution | 9 weight % |
| aluminium isopropoxide | 1 weight % |
| SrO | 0.01 weight % |
| isopropyl alcohol | balance |

EXAMPLE 28

According to the procedure given in Example 26, a high adhesive layer was formed by using 0.1 weight % n-butyl alcohol solution of methacrylate chromic chloride, and then a solution of a composition given below was applied to the high adhesive layer thus prepared in a manner similar to Example 26. Then, 0.1 weight % n-butyl alcohol solution of hexamethyldisilazane as an oriented lubricant was applied to the film thus prepared in a manner similar to Example 26, as followed by baking:

| tetrahydroxysilane 11% ethyl | |
|---|---|
| alcohol solution | 9 weight % |
| vanadyl isopropylate | 1 weight % |
| polyvinylbutyl | 0.005 weight % |
| n-butyl alcohol | balance |

EXAMPLE 29

Following the procedure in Example 26, a high adhesive layer was formed by using 0.1 weight % n-butyl alcohol solution of gamma-glycidoxypropyltrimethyloxysilane. Then, a solution of a composition given below was applied to the high adhesive layer in a manner similar to Example 26. Next, fluoro oil was applied as an oriented lubricant as followed by baking at 200° C. for 8 hours, cleaning with a neutral cleaning agent, water rinsing and cleaning with trichloroethylene, thereby forming an oriented lubricant layer:

| tetrahydroxysilane 11% ethyl | |
|---|---|
| alcohol solution | 9 weight % |
| tetraisopropyltitanate | 1 weight % |
| epoxy resin | 0.05 weight % |
| isobutyl acetate | 50 weight % |
| n-butyl alcohol | balance |

EXAMPLE 30

In accordance with the procedure given in Example 26, a high adhesive layer was formed by using a 0.1 weight % n-butyl alcohol solution of gamma-glycidoxypropyltrimethoxysilane, and then a solution of a composition given below was applied to the high adhesive layer thus prepared in a manner similar to Example 26. Next, 0.1 weight % n-butyl alcohol solution of hexamethyldisilane as an oriented lubricant was applied to the film thus prepared in a manner similar to Example 26:

| tetrahydroxysilane 11% ethyl | |
|---|---|
| alcohol solution | 9 weight % |
| zirconium N-butylate | 1 weight % |
| polyaminosilane | 0.1 weight % |
| n-butyl alcohol | balance |

EXAMPLE 31

Following the procedure given in Example 31, a high adhesive layer was formed by using 0.1 weight % n-butyl alcohol solution of methacrylate chromic chloride. Then a solution of a composition given below was applied as in Example 26, and 0.1 weight % n-butyl alcohol solution of perfluorooctadecyltrimethoxysilane was applied thereto, as followed by baking in a manner similar to Example 26:

| tetrahydroxysilane 11% ethyl | |
|---|---|
| alcohol solution | 9 weight % |
| tetraisopropyltitanate | 1 weight % |
| n-butyl alcohol | balance |

EXAMPLE 32

Following the procedure given in Example 26, a high adhesive layer was formed by using 0.1 weight % n-butyl alcohol solution of gamma-aminopropyltriethoxysilane. Then, a solution of a composition given below was applied to a polysilicate film containing a stress relaxation agent and hydrolysis polymer of metal alkoxide according to a spin coating process, thereby forming double layers of polysilicate containing a stress relaxation agent and hydrolysis polymer of metal alkoxide. Next, 0.1 weight % n-butyl alcohol solution of octadecyltrichlorosilane as an oriented lubricant was applied thereto as followed by baking in a manner similar to Example 26 to provide a protective film. Thus, a magnetic record member was formed.

| tetrahydroxysilane 11% ethyl | |
|---|---|
| alcohol solution | 9 weight % |
| zirconium isopropylate | 1 weight % |
| BaO | 0.01 weight % |
| n-butyl alcohol | balance |

COMPARATIVE EXAMPLE

According to the procedure given in Example 1, a solution of a composition given below was applied to a magnetic metal thin film medium. Then, a disc was baked at a temperature of 200° C. for 3 hours in an electric oven:

| tetrahydroxysilane 11% ethyl | |
|---|---|
| alcohol solution | 10 weight % |
| n-butyl alcohol | 90 weight % |

A peeling on the magnetic record member due to frictional contact with the head was checked as shown in the following Table by repeating recording and reproducing operations according to CCS system, in which the head is maintained in contact with a record member upon starting and completion of the operation, by using a head whose tip is tapered and which tends to collect dust and in connection with respective magnetic record members given in Examples 1 to 32 and the comparative example. The term "several % (percent) peeled" as used in the Table is meant by the friction traces given by the head, several of which have been peeled, while the magnetic metal thin film medium is found free of a damage. In addition, no head crash was experienced during the test.

Table

| Example | Cycle of CSS | surface condition |
|---|---|---|
| Comparative Example | 5,000 | several % peeled |
| Examples 1,2,3 | 5,000 | free of peeling |
| Examples 4,13,14 | 15,000 | free of peeling |
| Example 5 | 20,000 | free of peeling |
| Examples 6,7,11,12,15, 16,17,22,23 | 25,000 | free of peeling |
| Examples 8,9,18,24,25 | 30,000 | free of peeling |
| Example 10 | 35,000 | free of peeling |
| Examples 19,20,21,26 | 40,000 | free of peeling |
| Examples 27,28,31,32 | 45,000 | free of peeling |
| Examples 29,30 | 50,000 | free of peeling |

As is evident from the Table, the present magnetic record members illustrated in Examples are superior in resistance to frictional contact with a head as compared with the prior-art magnetic record members in which a polysilicate film, free of hydrolysis polymer of metal alkoxide and of a stress relaxation agent is provided directly on the magnetic metal thin film medium. More particularly, the magnetic record members of the present invention may be summarized as follows: magnetic record members (Examples 1 to 4, 13 to 16) including a polysilicate film which is formed on a magnetic metal thin film medium and contains a stress relaxation agent and/or hydrolysis polmyer of metal alkoxide; magnetic record members (Examples 5 to 12) in which a high adhesive layer is formed on a magnetic metal film medium corresponding to FIG. 2, and then a film consisting of polysilicate containing or free of a stress relaxation agent and/or hydrolysis polymer of metal alkoxide is formed thereon; magnetic record members (Examples 17 to 18, 22 to 25) in which a polysilicate film is formed on a magnetic metal thin film medium corresponding to FIG. 3, and then an oriented lubricant is coated thereon; and magnetic record members (Examples 19 to 21, 26 to 32) in which a high adhesive layer is formed on a magnetic metal thin film medium corresponding to FIG. 4 (Example 32 alone corresponds to FIG. 5), and then a film consisting of polysilicate, which contains or is free of a stress relaxation agent and metal alkoxide, is formed on the high adhesive layer in single layer or double layers, and then an oriented lubricant is coated thereon.

As for the resistance to environmental conditions, the environmental test was carried out as follows: The environmental test consisting of two cycles of test performed at a temperature of 65° C. and at a relative humidity of 90% for four hours and of one cycle at a temperature of −40° C. for three hours was repeated ten times. The test results revealed no adverse recording and reproducing characteristics and anti-abrasion characteristic.

It is apparent that the above results may be obtained by using organic polymer having at least one functional group reactive to one or both of polysilicate and hydrolysis polymer of metal alkoxide, metal oxides, silane coupling agents, surface coupling agents, a combination thereof, hydrolysis polymer of metal alkoxide, oriented lubricant and high adhesive agents, other than those given in Examples of the invention.

Meanwhile, according to the Examples of the invention, a metal is used as a non-magnetic disc substrate. However, plastic, glass, ceramic and the like may be used irrespective of the kinds of substrates.

Furthermore, in the Examples above, the magnetic record member in its entirety is baked at 200° C. However, the magnetic record member may be thoroughly dried at a room temperature (about 25° C.) to remove a solvent having a high vaporizing pressure to attain the objects of the present invention.

In addition, it is possible to bake a magnetic record member at temperatures over 200° C., as long as the magnetic characteristic of a magnetic record member is not impaired.

Furthermore, in Example 32 in which a polysilicate film containing a stress relaxation agent and hydrolysis polymer of metal alkoxide is formed in single layer or double layers even in case where a stress relaxation agent and hydrolysis polymer of metal alkoxide is contained or not contained and/or in case where a high adhesive layer and/or oriented lubricant agent is not provided, the anti-abrasion characteristic in the present invention is superior to that of the comparative Example. Also, similar technical advantages mentioned above can be derived by forming high adhesive layer between the double layer of polysilicate.

What is claimed is:

1. A magnetic record member for a magnetic disc or drum comprising:
   a non-magnetic alloy disc substrate having a surface which is polished to a mirror finish;
   a magnetic metal thin film medium coated on said surface of said disc; and
   a protective polysilicate layer coated on said magnetic thin film medium, wherein said polysilicate is the dehydration condensation polymerization product of tetraalkoxysilane or tetrahydroxysilane, said polysilicate layer containing a stress relaxation agent.

2. A magnetic record member as claimed in claim 1 wherein said stress relaxation agent comprises a silane coupling agent.

3. A magnetic record member as claimed in claim 1 wherein said stress relaxation agent comprises a surface coupling agent.

4. A magnetic record member as claimed in claim 1 wherein said stress relaxation agent comprises at least one organic polymer having a function group reactive with either a polysilicate, a metal oxide, a silane coupling agent, or a surface coupling agent.

5. A magnetic record member as claimed in claim 1, wherein said stress relaxation agent comprises at least one organic polymer having a functional group reactive with said polysilicate layer.

6. A magnetic record member as claimed in claim 5, wherein said functional group is chosen from the group consisting of —COOH, —NH$_2$, —SH, —COOR, —NHR, >NH, —CHO, —NCO, Si—OH, Si—OR, Si—X,

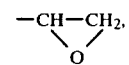

—CH$_2$OH,

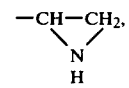

—OCOR, —OH, wherein R represents an alkyl group and X represents halogen.

7. A magnetic record member as claimed in claim 1 wherein said stress relaxation agent comprises a metal oxide.

8. A magnetic record member as claimed in claim 7, wherein said metal oxide is chosen from the group consisting of BaO, SrO, LiO, Na$_2$O, K$_2$O, Rb$_2$O, Cs$_2$O, MgO, CaO, ZnO, PbO, Al$_2$O$_3$, GaO, MnO, FeO, BeO, F$_2$O$_3$, CdO and Tl$_2$O$_3$.

9. A magnetic record member for a magnetic disc or drum comprising:
   a non-magnetic alloy disc substrate having a surface which is polished to a mirror finish;
   a magnetic metal thin film medium coated on said surface of the said disc;
   a protective polysilicate layer coated on said magnetic thin film medium, wherein said polysilicate is the dehydration condensation polymerization product of tetraalkoxysilane or tetrahydroxysilane, said polysilicate layer containing a hydrolysis polymer of metal alkoxide.

10. A magnetic record member as claimed in claim 9, wherein the metal of said metal alkoxide is chosen from the group consisting of:
    Ti, V, Zr, Al, Sn, Zn, Be, Ce, Co, Cr, Cu, Dy, Eu, Fe, Ga, Hf, In, Mg, Mn, Mo, Nb, Ni, Pb, Rh, Sb, Th, Tl, Ta, V, and W.

11. A magnetic record member for a magnetic disc or drum comprising:
    a non-magnetic alloy disc substrate having a surface which is polished to a mirror finish;
    a magnetic metal thin film medium coated on said surface of said disc;
    a protective polysilicate layer coated on said magnetic thin film medium, wherein said polysilicate is the dehydration condensation polymerization product of tetraalkoxysilane or tetrahydroxysilane, said polysilicate layer containing a stress relaxation agent and a hydrolysis polymer of metal alkoxide.

12. A magnetic record member as claimed in claim 11, wherein the metal of said metal alkoxide is chosen from the group consisting of:
    Ti, V, Zr, Al, Sn, Zn, Be, Ce, Co, Cr, Cu, Dy, Eu, Fe, Ga, Hf, In, Mg, Mn, Mo, Nb, Ni, Pb, Rh, Sb, Th, Tl, Ta, V, and W.

13. A magnetic record member as claimed in claim 11, wherein said stress relaxation agent comprises a metal oxide chosen from the group consisting of:

BaO, SrO, LiO, Na$_2$O, K$_2$O, Rb$_2$O, Cs$_2$O, MgO, CaO, ZnO, PbO, Al$_2$O$_3$, GaO, MnO, FeO, BeO, F$_2$O$_3$, CdO and Tl$_2$O$_3$.

14. A magnetic record member as claimed in claim 11, wherein said stress relaxation agent comprises a silane coupling agent.

15. A magnetic record member as comprised in claim 11, wherein said stress relaxation agent comprises a surface coupling agent.

16. A magnetic record member as claimed in claim 11, wherein said stress relaxation agent comprises at least one organic polymer, having a functional group reactive with either said polysilicate layer or said hydrolysis polymer of metal alkoxide.

17. A magnetic record member as claimed in claim 16, wherein said functional group is chosen from the group consisting of: —COOH, —NH$_2$, —SH, —COOR, —NHR, >NH, —CHO, —NCO, Si—OH, Si—OR, Si—X,

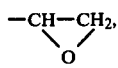

—CH$_2$OH,

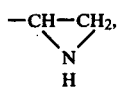

—OCOR, —OH, where R represents the alkyl group and X represent halogen.

18. A magnetic record member as claimed in claim 11, wherein said stress relaxation agent comprises at least one organic polymer having a functional group reactive with either a polysilicate, a metal oxide, a silane coupling agent, or a surface coupling agent.

19. A magnetic record member as claimed in claim 18 wherein said silane coupling agent is a polyaminosilane.

20. A magnetic record member for a magnetic disco or drum comprising:
a non-magnetic alloy disc substrate having a surface which is polished to a mirror finish;
a magnetic metal thin film medium coated on said surface of said disc;
a highly adhesive layer coated on said magnetic thin film medium;
a polysilicate protective layer, wherein said polysilicate is the dehydration condensation polymerization product of tetraalkoxysilane or tetrahydroxysilane.

21. A magnetic record member as claimed in claim 20, wherein said highly adhesive layer comprises a silane coupling agent.

22. A magnetic record member as claimed in claim 20, wherein said highly adhesive layer comprises a methacrylate chromic chloride.

23. A magnetic record member comprising:
a non-magnetic alloy disc substrate having a surface which is polished to a mirror finish;
a magnetic metal thin film medium coated on said surface of said disc;
a highly adhesive layer coated on said magnetic thin film medium;
a protective polysilicate film coated on said adhesive layer, wherein said polysilicate is the dehydration condensation polymerization product of tetraalkoxysilane or tetrahydroxysilane;
an oriented lubricant coated on said polysilicate film.

24. A magnetic record member as claimed in claim 23, wherein said oriented lubricant is a combination of at least two members of the group of alkoxysilane, chlorosilane and silazane.

25. A magnetic record member in accordance with claim 23, wherein said oriented lubricant is a combination of at least two members of the group of oriented dimethylsilcone oil, methylphenylsilicone oil, fluorosilicone oil and fluoro oil.

* * * * *

UNITED STATES PATENT AND TRADEMARK OFFICE
CERTIFICATE OF CORRECTION

PATENT NO. : 4,152,487
DATED : May 1, 1979
INVENTOR(S) : Masahiro Yanagisawa

It is certified that error appears in the above-identified patent and that said Letters Patent are hereby corrected as shown below:

On the cover sheet under Foreign Application Priority Data, for the first listed application delete "51-52386" and read -- 51-152386 --; and additionally read --

| | | | | |
|---|---|---|---|---|
| Sep. | 5, 1977 | [JP] | Japan | 52-107010 |
| Sep. | 5, 1977 | [JP] | Japan | 52-107011 |
| Sep. | 6, 1977 | [JP] | Japan | 52-107410 |
| Sep. | 6, 1977 | [JP] | Japan | 52-107411 |
| Sep. | 7, 1977 | [JP] | Japan | 52-108234 |
| Sep. | 17, 1977 | [JP] | Japan | 52-111995 -- |

Signed and Sealed this

Twenty-third Day of October 1979

[SEAL]

Attest:

RUTH C. MASON
Attesting Officer

LUTRELLE F. PARKER
Acting Commissioner of Patents and Trademarks